Patented Sept. 28, 1937

2,094,414

UNITED STATES PATENT OFFICE 2,094,414

AZO DYESTUFFS

Curt Schuster, Ludwigshafen-on-the-Rhine, and Albert Schmelzer, Cologne-Muhlheim, Germany, assignors to General Aniline Works, Inc., New York, N. Y., a corporation of Delaware No Drawing. Application August 23, 1935, Serial No. 37,502. In Germany August 25, 1934

5 Claims. (Cl. 260—86)

The present invention relates to new azo dyestuffs.

We have found that valuable azo dyestuffs are obtained by coupling beta-hydroxy triphenylene or its derivatives with any aromatic diazo compounds. Suitable derivatives of beta-hydroxy triphenylene are for example the beta-hydroxy triphenylene-ortho-carboxylic acid (which can be obtained by treating beta-hydroxytriphenylene with carbon dioxide under pressure and which corresponds to the formula

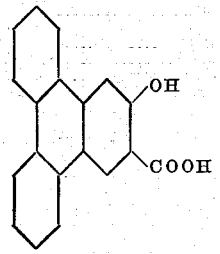

or its acid amide or arylides, beta-hydroxy triphenylene sulphonic acid or the hydroxy compounds of trimethyl triphenylene. These new dyestuffs yield dyeings having good properties as regards fastness. When the diazo compounds contain no solubilizing groups, the dyestuffs are preferably produced on the fibres themselves.

The hydroxy compounds of triphenylene may be prepared from the corresponding triphenylene sulphonic acids (obtainable from triphenylene and concentrated sulphuric acid or chlorsulphonic acid) by fusion with caustic alkalies.

The following examples will further illustrate how the said invention may be carried out in practice but the invention is not restricted to these examples. The parts are by weight.

Example 1

Cotton is bottomed in a bath consisting of 6 parts of beta-hydroxy-triphenylene, 12.5 parts of 35 per cent caustic soda solution and 1000 parts of water for half an hour at 30° C. with a bath ratio of 1:20. The fabric is then pressed out and the beta-hydroxy-triphenylene which has been adsorbed is coupled in acetic acid solution with diazotized 1-amino-2-nitro-4-chlorbenzene. The fabric is then soaped at the boiling point.

The resulting dyeing has beautiful, deep red-brown shades.

Other very beautiful dyestuffs are obtained by coupling beta-hydroxy triphenylene with the following diazo compounds:

| Diazo component | Shade of color |
|---|---|
| 1-amino-2-chlorbenzene | Pale yellow-brown. |
| 1-amino-2,5-dichlorbenzene | Red-brown. |
| 1-amino-2-nitrobenzene | Brown. |
| 1-amino-2-methoxy-4-benzoylamino-5-methyl-benzene | Brown-violet. |
| 1-amino-2-chlor-4-benzoylamino-5-methoxybenzene | Very clear red-brown. |
| 4-amino-3-methoxydiphenylamine | Violet. |
| 1-amino-4-benzoylamino-2,5-diethoxy-benzene | Violet. |
| 1-amino-4-benzoylamino-2,5-dimethoxy-benzene | Blue-violet. |
| Azo dyestuff derived from 1-amino-4-nitrobenzene and 1-amino-2,5-dimethoxy-benzene | Blue-black. |

A dark blue shade of color is obtained by employing tetrazotized 4,4'-diamino-3,3'-dimethoxydiphenyl as tetrazo component.

The dyestuffs may also be prepared in substance instead of on the fibres.

Example 2

A solution or suspension of the diazo compound of 19.5 parts of the sodium salt of 1-aminobenzene-4-sulphonic acid is added while stirring well and cooling with ice to a solution of 24.4 parts of beta-hydroxy triphenylene in 200 parts of twice-normal caustic soda solution. When the coupling is completed, the dyestuff is salted out. It yields on wool from an acid bath deep red-brown dyeings having good properties as regards fastness.

Example 3

A solution of the diazo compound derived from 16.1 parts of 1-amino-2,5-dichlorbenzene is added to a solution, rendered alkaline with sodium carbonate, of 36.8 parts of the sodium salt of a beta-hydroxy triphenylene sulphonic acid which has been obtained by treating beta-hydroxy triphenylene with 98 per cent sulphuric acid at from 35° to 40° C. When the coupling is completed a dyestuff is obtained which gives dyeings having good properties as regards fastness. It dyes wool from an acid bath red-brown shades and may be advantageously employed for dyeing leather.

Example 4

26 parts of beta-hydroxy triphenylene are dissolved in caustic soda solution and coupled with a solution of the diazo compound derived from 23.4 parts of 1-amino-2-hydroxy-5-nitrobenzene-3-sulphonic acid after adding the amount of sodium carbonate necessary for coupling. After stirring for about 12 hours, the whole is heated for a short time at from 40° to 50° C. and the dyestuff is then salted out.

The dyestuff dyes wool brown shades and yields by afterchroming on the fibres a very fast chocolate brown. It may also be employed according to the single-bath process. By boiling, for example with chromium formate, the dyestuff may be converted in substance into the complex chromium compound which dyes silk, for example, dark brown shades.

Example 5

The amount of sodium carbonate necessary for coupling is added to a solution of 27 parts of beta-beta-dihydroxy-triphenylene in 80 parts of 10 per cent caustic soda solution and then the solution of the diazo compound derived from 17.3 parts of 1-amino-benzene-3-sulphonic acid is allowed to flow in slowly. The dyestuff is salted out when coupling is completed. It yields deep brown dyeings having good properties as regards fastness on leather. The said dihydroxy-triphenylene may be obtained by alkali fusion of the triphenylene disulphonic acid obtained by the treatment of triphenylene with 96 percent sulphuric acid at from 170° to 180° C.

Example 6

Cotton is bottomed in a bath consisting of 3 parts of the dianilide of beta-beta-dihydroxy-triphenylene dicarboxylic acid (obtainable by causing carbon dioxide to react with beta-beta-dihydroxy-triphenylene under pressure), 12.5 parts of caustic soda solution of 40° Bé. strength and 1000 parts of water, for half an hour at room temperature, the ratio of bath being 1:20. The cotton is then pressed out and treated for 1 hour with a solution of the diazo compound of 1-amino-2-nitro-4-chlorbenzene containing common salt and rendered alkaline with sodium carbonate solution. When the coupling is complete, the cotton is soaped in the usual manner and dried. The resulting dyeing has violet-brown shades of good fastness properties.

In an analogous manner dyestuffs giving from brown to grey dyeings are obtained by employing the di-ortho-toluidide, di-alpha-naphthyl-amide or di-ortho-anisidide of the said dihydroxy-triphenylene dicarboxylic acid instead of its dianilide.

Example 7

Well boiled and dried cotton yarn is bottomed with an aqueous solution which contains per liter 2.6 grams of beta-hydroxy-triphenylene-ortho-carboxylic acid anilide, 7 grams of 35 per cent caustic soda solution and 5 grams of Turkey red oil. The bottomed yarn is then thoroughly pressed out and the dyeing is developed in a diazo solution containing sodium bicarbonate and per each liter of solution the diazo compound from 1.75 grams of 2-nitro-4-chloraniline.

After finishing the operation in the usual manner by rinsing, soaping and drying a dark brown dyeing of good fastness properties is obtained.

By employing 2,3-dichloraniline as the diazo component, a dyestuff giving also deep brown dyeings is obtained.

Example 8

50 grams of cotton yarn are bottomed in a bath containing 3 grams of beta-hydroxy-triphenylene-ortho-carboxylic acid-ortho'-toluidide which has the formula

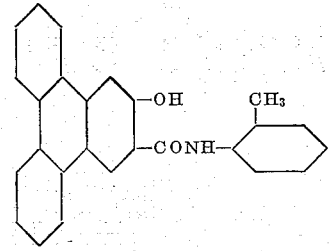

in 1000 cubic centimeters for half an hour at 30° C. The cotton is then pressed out and treated for half an hour with 1000 cubic centimeters of a bath rendered weakly acid by means of acetic acid and containing the diazo compound of 2.3 grams of 2,5-dichloraniline and 50 parts of common salt. The cotton is then washed and aftertreated in the heat with soap and soda. A dyeing having dark brown shades and very good fastness as regards fastness to boiling and chlorine is obtained.

In an analogous manner, similar shades of color may be obtained by employing the diazo components set forth in the following table the coupling component being the same as above:

| Diazo component | Shade of color |
|---|---|
| 1-amino-3-chlorbenzene | Dark brown having a tinge of red. |
| 1-amino-2-nitrobenzene | Dark brown. |
| 1-amino-3-nitrobenzene | Black-brown. |
| 4-chlor-2-nitro-1-aminobenzene | Dark brown. |
| 4-nitro-2-methoxy-1-aminobenzene | Dark brown. |
| 4-nitro-1-aminobenzene | Black-brown having a tinge of red. |
| 1-amino-2-methoxybenzene-5-sulphonic acid diethylamide. | Garnet having a tinge of brown. |
| 3-nitro-6-methyl-1-aminobenzene | Brown having a tinge of violet. |
| 4-amino-2,3'-dimethyl-1,1'-azobenzene | Black-brown. |
| 1-omega-trifluormethyl-4-chlor-3-aminobenzene. | Brown having a tinge of red. |

In an analogous manner from beta-hydroxy-triphenylene-ortho-carboxylic acid-para-anisidide together with the following diazo components the following shades of color are obtained:

| Diazo component | Shade of color |
|---|---|
| 2,5-dichlor-1-aminobenzene | Dark brown having a tinge of red. |
| 4-chlor-2-nitro-1-aminobenzene | Dark brown. |
| 4-nitro-1-aminobenzene | Dark brown having a tinge of yellow. |
| 4-amino-2,3'-dimethyl-1,1'-azobenzene | Black brown. |
| 1-omega-trifluormethyl-4-chlor-3-aminobenzene. | Brown having a tinge of red. |

Example 9

Well boiled and dried cotton is bottomed in a bath containing 3 grams of beta-hydroxy-triphenylene-ortho-carboxylic acid-para-chloranilide, 4.5 cubic centimeters of Turkey red oil and 6 cubic centimeters of sodium hydroxide solution of 38° Bé. strength and 5 cubic centimeters of a 45 per cent cellulose waste liquor in 1000 cubic centimeters. The cotton is then pressed out and entered while still wet into a solution containing the diazo compound of 7 grams of meta-nitraniline. After developing the cotton is rinsed and soaped. The dyeing thus obtained has powerful negro-brown shades.

If 1-methoxy-2-aminobenzene-4-sulphonic acid diethyl amide is employed as the diazo component brown dyeings having a tinge of violet are obtained.

By employing beta-hydroxy-triphenylene-ortho-carboxylic acid meta-toluidide and 1-amino-2-methyl-5-nitrobenzene as initial substances, a dyestuff giving beautiful negro-brown dyeings is obtained. A similar dyestuff giving negro-brown dyeings of good fastness to light is formed by employing 1 - methoxy-2-amino-4-chlorbenzene as the diazo component. By employing 1-methoxy-2-benzoylamino-4-chlor - 5 - aminobenzene, a dyestuff giving brown dyeings having a tinge of violet is obtained.

In an analogous manner, a dyestuff giving intense chocolate-brown dyeings is obtained by coupling beta-hydroxy-triphenylene - ortho-carboxylic acid-para-toluidide with the diazo compound of 1-methoxy-2-amino-4-chlorbenzene.

*Example 10*

Cotton bottomed in a bath corresponding to that employed in the first paragraph of Example 9 but containing 6 grams of beta-hydroxy-triphenylene-ortho-carboxylic acid ortho-anisidide is introduced into a solution containing the diazo compound of 1-methoxy-2-amino - 5 - nitrobenzene and sodium bicarbonate a very beautiful negro-brown dyeing being obtained.

By employing 1-amino-2,5-dichlorbenzene or 1-amino-2-nitrobenzene, dyestuffs giving reddish brown dyeings are obtained.

Dyestuffs giving brown shades having a tinge of violet are obtained by using 3-nitro-4-toluidine or 1-amino-2-nitro-4-chlorbenzene as the diazo components, and dyestuffs giving pure dark brown dyeings by employing 5-nitro-2-toluidine or 1-methoxy-2-amino-4-chlorbenzene.

What we claim is:—

1. Dyestuffs selected from the group consisting of azo dyestuffs corresponding to the general formula:

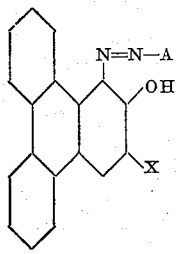

in which A stands for a member of the group consisting of aryl groups and sulphonated aryl groups, and X represents a member of the group consisting of hydrogen, the carboxylic acid group and carboxylic acid amide groups, and the sulphonic acid derivatives of these azo dyestuffs.

2. Azo dyestuffs corresponding to the general formula:

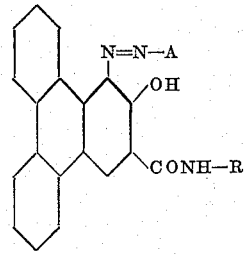

in which A stands for a member of the group consisting of aryl groups and sulphonated aryl groups and R stands for an aryl group.

3. The azo dyestuff having the formula:

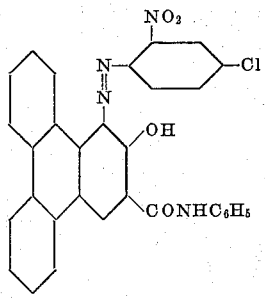

4. The azo dyestuff having the formula:

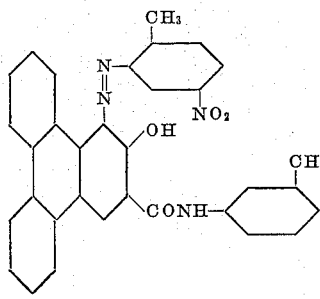

5. The azo dyestuff having the formula:

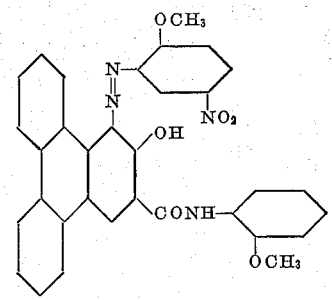

CURT SCHUSTER.
ALBERT SCHMELZER.